United States Patent [19]
Eguchi

[11] Patent Number: 5,341,156
[45] Date of Patent: Aug. 23, 1994

[54] IMAGE FORMING APPARATUS OF LASER SCANNING TYPE

[75] Inventor: Tatsuya Eguchi, Toyohashi, Japan

[73] Assignee: Minolta Camera Kabushiki Kaisha, Osaka, Japan

[21] Appl. No.: 837,858

[22] Filed: Feb. 18, 1992

[30] Foreign Application Priority Data

Feb. 19, 1991 [JP] Japan .................. 3-047655

[51] Int. Cl.$^5$ ............................. B41J 2/435
[52] U.S. Cl. ................................. 346/108
[58] Field of Search ............ 346/1.1, 76 L, 108, 346/107 R, 160

[56] References Cited

U.S. PATENT DOCUMENTS

| | | |
|---|---|---|
| 4,264,120 | 4/1981 | Uchiyama et al. |
| 4,423,426 | 12/1983 | Kitamura .................. 346/108 |
| 4,557,586 | 12/1985 | Hayashi et al. .......... 355/11 |
| 5,164,745 | 11/1992 | Matsuoka ................. 346/108 |

Primary Examiner—Mark J. Reinhart
Attorney, Agent, or Firm—Price, Gess & Ubell

[57] ABSTRACT

A laser beam scanning type image forming apparatus having a shield member arranged at the terminal side of a main scan of photosensitive member for blocking a laser beam irradiated to the area outside of image forming area. Laser beam output is forcibly caused at a timing of the arrival at the shield member and continued until being detected by SOS sensor, the forcibly caused laser beam being blocked by the shield member. With such an arrangement, it becomes possible to detect laser beam at the time the light amount thereof is stable and to improve precision of time for detecting laser beam.

13 Claims, 5 Drawing Sheets

IMAGE FORMING APPARATUS OF LASER SCANNING TYPE

BACKGROUND OF THE INVENTION

1. Field of the Invention

The present invention relates to an image forming apparatus of a laser scanning type.

The apparatus of the present invention improves the timing precision of laser beam detection system by stabilizing the amount of laser light to be detected by the laser beam detecting system (start-of-scan (SOS) sensor) prior to detection.

2. Description of the Related Art

Laser printers, laser COM systems and the like are provided with devices for forming images by laser scanning.

The aforesaid devices use various control methods which precisely align the image front edge position of each scan line, detect the laser beam at a predetermined position before the start of scanning and start the laser beam output based on the line image data after a predetermined period has elapsed from the time of the laser beam detection so as to produce superior images without image jitter.

The amount of light of a laser beam emitted by a semiconductor laser is affected by heat characteristics called droop characteristics.

Figure 1:
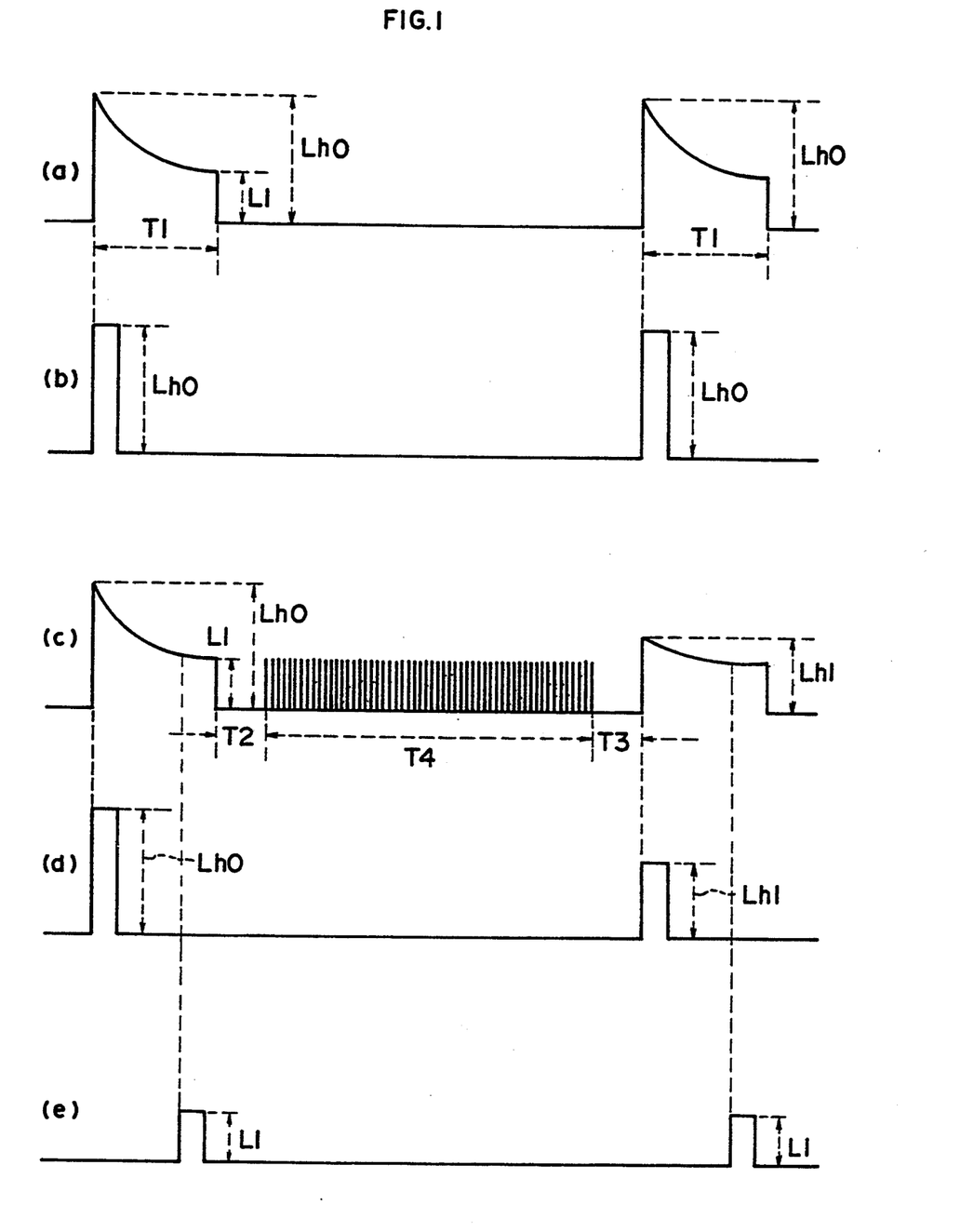
FIG. 1 is a timing chart showing the relationship between the SOS signal levels and the timing for outputting the SOS signals from the forced beam generation of droop characteristics.

The aforesaid droop characteristics are shown in interval T1 of FIG. 1a. That is, the amount of light is greater (amount of light: Lh0) immediately after the semiconductor laser is turned on due to the comparatively low temperature, and is gradually reduced as the temperature rises until the light is eventually stabilized at a constant value (L1). The light quantity Lh0 may be several fold greater than L1.

As shall be fully described later, the aforesaid interval T1 is a time zone for forcing the semiconductor laser to switch on to allow detection of the laser beam by the aforementioned SOS sensor. The interval T1 is hereinafter referred to as "forced beam generating interval T1."

In FIG. 1a, no image data are present between the first forced beam generating interval T1 (left side) and the second forced beam generating interval T1 (right side). That is, the semiconductor laser is set in the off state. Thus, the semiconductor laser temperature decreases between the first forced beam generating interval T1 and the second forced beam generating interval T1. Accordingly, the initial amount of light of the second forced beam generating interval T1 is identical to the initial amount of light of the first forced beam generating interval T1, i.e., the high value Lh0.

At this time, the amount of light of the detected laser beam exhibits no significant fluctuation from that of the first laser beam detected in the forced beam generating interval T1, as shown in FIG. 1b.

On the other hand, when image data are present in the interval T4 between the first forced beam generating interval T1 (left side) and the second forced beam generating interval T1 (right side), the semiconductor laser is turned on and off in accordance with said image data so that the temperature of the semiconductor laser does not decrease during the image signal interval T4. Therefore, the initial amount of light of the second forced beam generating interval T1 is a value Lh1 which is lower than the initial amount of light of the first forced beam generating interval T1.

At this time, the amount of light of the detected laser beam fluctuates markedly from that of the first laser beam detected in the forced beam generating interval T1 due to the effects of droop characteristics, as shown in FIG. 1d.

In a general case, image data are present in image signal interval T4 like FIG. 1c.

The laser beam detection time as detected via the SOS sensor (the standard period for starting the clock for image data output) is determined as the period wherein the SOS sensor output exceeds a predetermined threshold level $\phi$, so that laser beam output based on the line image data starts after a predetermined time period has elapsed after the aforesaid beam detection period. That is, control is executed to precisely align the image front edge position of each scan line so as to prevent image jitter.

Accordingly, when the amount of laser light is high (broken line: Lh0) and low (solid line: Lh1), as indicated by ta and tb in FIG. 2, the aforementioned standard period produces a slight dislocation which in turn causes dislocation of the laser beam output starting position based on the line image data of each scan line, thereby resulting in image jitter.

Figure 2:
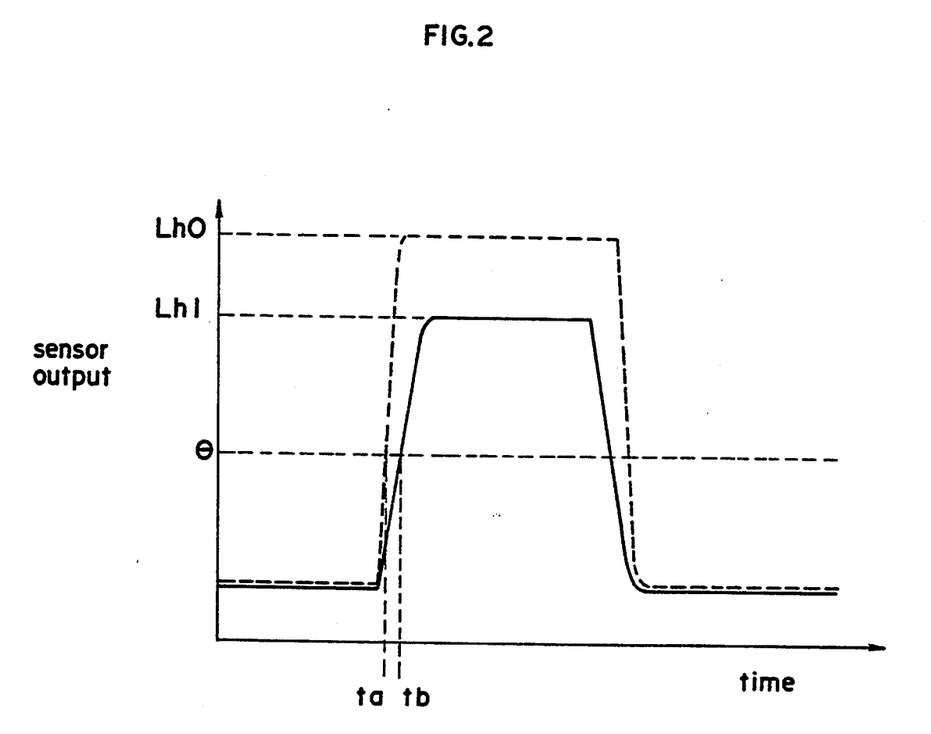
FIG. 2 is an illustration showing the principle for determining the time that becomes the standard for starting time of image data output.

In the previously described forced beam generating interval T1, the initial laser beam of the interval T1 has a light emission which is easily affected by fluctuations in the temperature of the semiconductor laser. The laser beam is detected by the SOS sensor, as shown in FIG. 1d, and the standard period is determined as shown in FIG. 2. When control is executed in this manner, discrepancies are produced in the standard period causing image jitter.

U.S. Pat. No. 4,264,120 discloses a method for eliminating the previously described disadvantages wherein a stabilized light quantity can be detected via an SOS sensor at the end of a predetermined forced beam generating interval T1 so as to improve the precision of the reference period thereby.

In high-speed laser printers, however, it is currently impossible to set the forced beam generating interval T1 so as to be long enough for the beam light quantity to stabilize by the end of said interval T1. That is, it is currently impossible to adapt the method disclosed in U.S. Pat. No. 4,264,120 to high-speed laser printers.

SUMMARY OF THE INVENTION

A main object of the present invention is to provide an image forming apparatus of the laser scanning type capable of producing excellent images by preventing the generation of image jitter.

A further object of the present invention is to provide an image forming apparatus of the laser scanning type capable of improving the time precision for laser beam detection via an SOS sensor.

A still further object of the present invention is to provide an image forming apparatus of the high-speed laser scanning type capable of reliably stabilizing the laser beam at the end of the previously described forced beam generating interval T1 and detecting the beam at the end of said interval via an SOS sensor.

These and other objects of the present invention are achieved by providing an image forming apparatus of the laser scanning type comprising:

beam generating means for generating a beam from a semiconductor laser, said beam being modulated by drive data;

an optical system for repeatedly scanning a beam in a main scan direction on the surface of an image forming member;

image forming means for forming an image corresponding to the aforesaid drive data on the surface of the image forming member by displacing the surface in a sub scan direction vertical to the main scan direction;

beam detecting means provided at the beginning side of the main scan for detecting the laser beam before the scan of the image forming member;

a shield member provided at the terminal side of the main scan to block the irradiation of the laser beam to the outside of the image forming area on the surface of the image forming member;

timing means for starting timing on the basis of the detection time of the laser beam detecting means;

beam driving means for driving the beam generating means to stop the beam output with each beam detecting timing cycle, starting beam output in accordance with an image data when a predetermined period has elapsed after the start of the timing by the timing means, and forcibly causing beam output when the main scan beam reaches the shield member.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter.

(1) Laser Printer Construction

First, the main portions (those portions relating to electrophotographic recording) of the laser printer of the present embodiment are briefly described below, with reference to FIG. 3.

As shown in the drawing, the laser printer is provided with laser diode (semiconductor laser) 51, beam expander 52 for enlarging the diameter of the beam emitted from the laser diode 51 such that said expanded beam comprises parallel rays, polygonal mirror 53 for deflecting the laser beam passing through the beam expander 52 as said mirror rotates at high speed, f·$\theta$ image forming lens 54 for forming images on the surface of the photosensitive drum 55 via the laser beam deflected by the polygonal mirror 53, and photosensitive drum 55.

Figure 3:
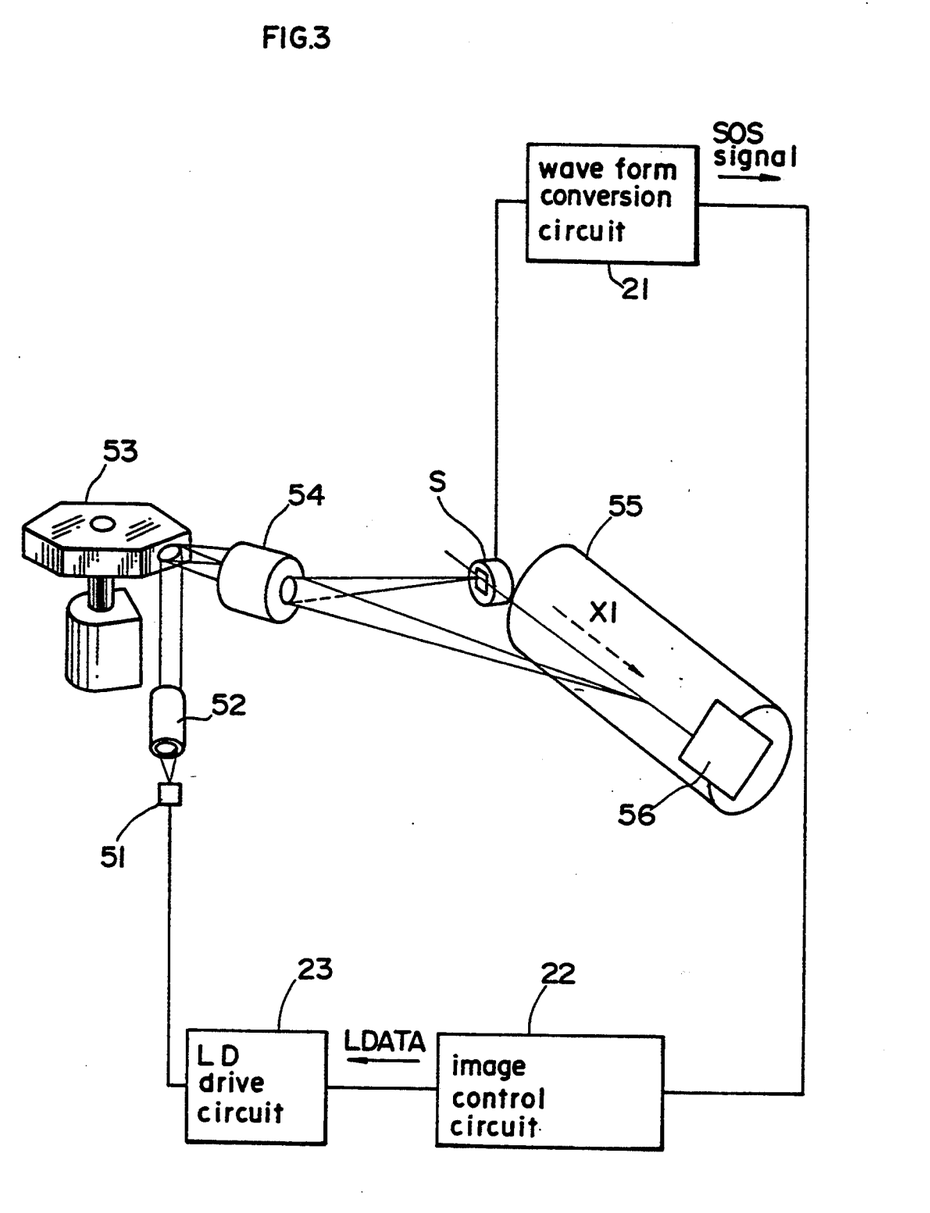
FIG. 3 shows the construction of the essential portions (those portions related to the formation of electrostatic latent images) of a laser printer of an embodiment of the present invention.

The deflection by the polygonal mirror 53 deflects the laser beam in the horizontal direction (main scan direction, i.e., the direction indicated by the broken arrow X1 in FIG. 3).

On the other hand, the surface of the photosensitive drum 55 is uniformly charged prior to the beam scan, such that an electrostatic latent image having a pattern corresponding to the laser beam is formed on said surface of the photosensitive drum 55.

Furthermore, an optical sensor (SOS sensor) S for detecting the passage of the laser beam is provided at a position in front of the photosensitive drum 55 (i.e., the position directly in front of the position where the laser beam scans the surface of the photosensitive drum 55 in the main scan direction X1). The output signals of the aforesaid optical sensor S is input to the waveform converting circuit 21 and converted to start-of-scan (SOS) signals, which are then transmitted to the image control circuit 22.

A shield member 56 is arranged at a position directly outside the image forming area (image area SOI∼EOI in FIG. 4) of the photosensitive drum 55 (i.e., a position directly outside the image forming area on the surface of the photosensitive drum 55 wherein the laser beam scans the surface of said drum 55 in the main scan direction X1).

Figure 4:
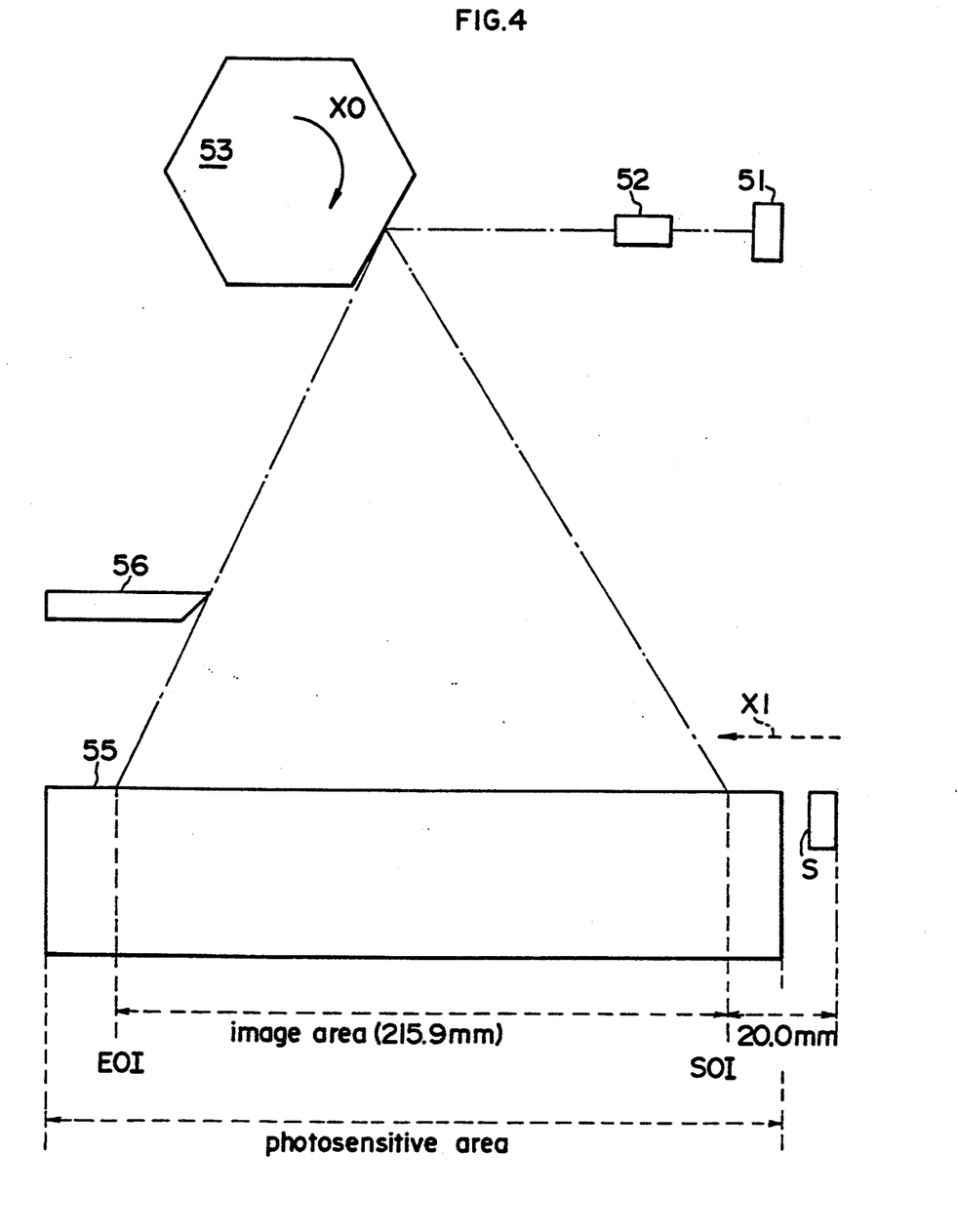
FIG. 4 is an illustration showing the positional relationship of the image forming area of the photosensitive drum and the shield member of the laser printer.

By means of the aforesaid positioning of the shield member 56, the laser beam output is completely blocked until the laser beam (forced generation beam) is detected by the SOS sensor S so as to not irradiate the surface of the photosensitive drum 55.

Figure 5:
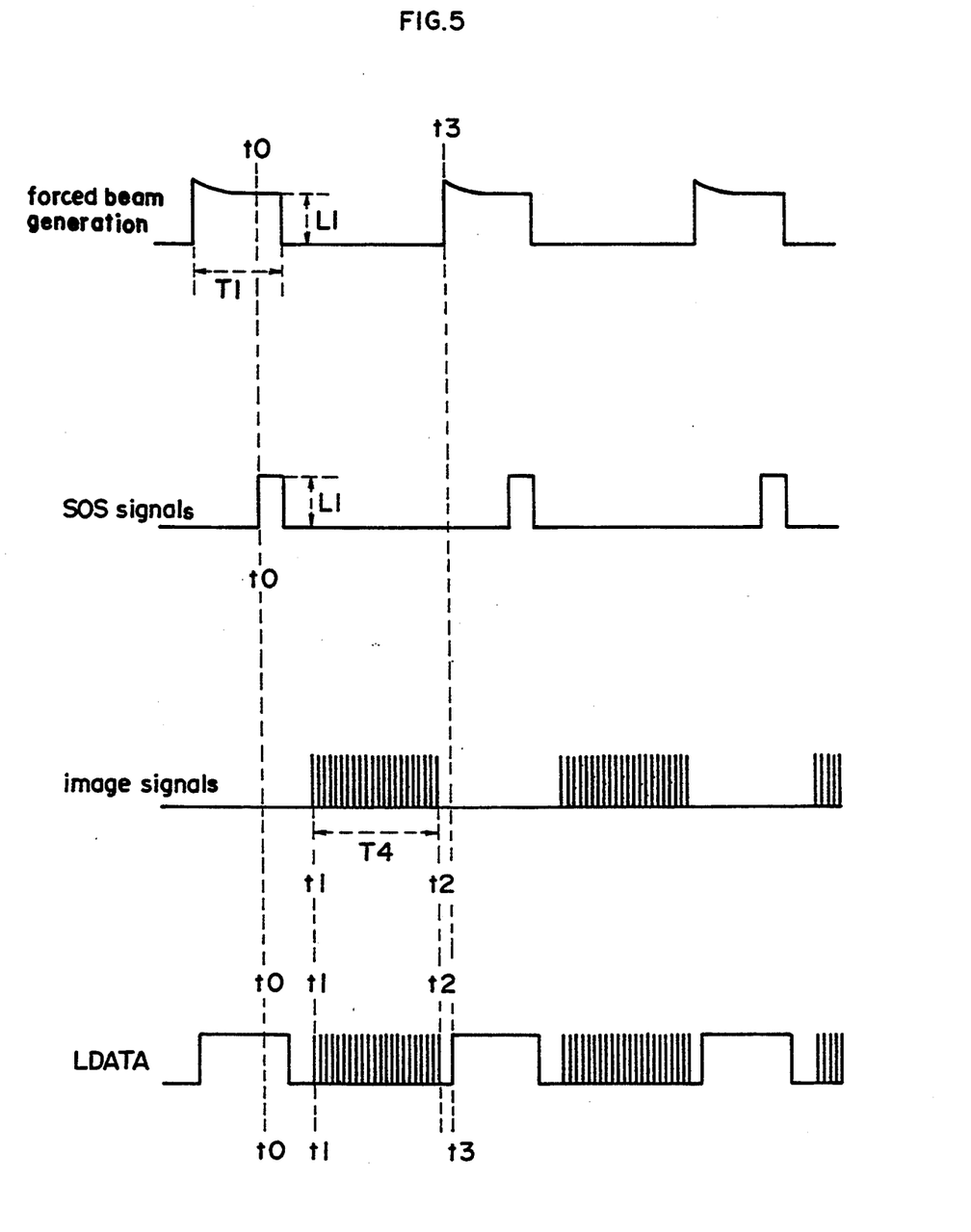
FIG. 5 is a flow chart showing the relationships among the [beam generation], [SOS signals], [image signals], and [LDATA] of the laser printer of the embodiment.

On the other hand, when the aforementioned image control circuit 22 receives the SOS signals from the waveform converting circuit 21, the timing is started (time t0 in FIG. 5).

After a predetermined time (time t1 in FIG. 5) from the start of the aforesaid timing period has elapsed, the image data transmitted from the host computer or the like are input to the LD (laser diode) drive circuit 23 as active in line units.

Thereafter, when the output of a single line of image data has been completed (time t2 in FIG. 5), the standby state is active until the end of the image forming area is reached, and the data for the forced beam generation of the semiconductor laser 51 is output to the LD drive circuit 23 at the timing (time t3 in FIG. 5) whereby the laser beam scan reaches the leading edge position of the shield member 56. The aforesaid data output is continued until the SOS signal for the next line is input.

Data for generating the laser beam cannot be output during the timing period from the completion of a single line of image data output until the scan reaches the leading edge position of the shield member 56 (i.e., period t2∼t3 in FIG. 5).

The LD drive circuit 23 drives the laser diode 51 based on the line data (LDATA, i.e., image data and forced beam generation data) transmitted from the image control circuit 22.

Thus, the laser beam emitted from the laser diode 51 is modulated in accordance with the line data LDATA.

That is, the laser beam is generated to form an electrostatic latent image in accordance with the image data in the image forming area, while it is forcibly generated from the leading edge position of the shield member 56 (top left edge in FIG. 3 and right edge in FIG. 4) to the SOS sensor S position.

(2) Examples of LDATA Output Timing

LDATA output timing is described hereinafter with reference to FIGS. 4 and 5.

As shown in FIG. 4, the laser beam emitted from the semiconductor laser 51 is deflected by the polygonal mirror 53 rotating at high speed in the direction indicated by arrow X0, and scans the surface of the photosensitive drum 55 in the direction indicated by arrow X1 (main scan direction).

Prior to scanning each line of the image area (main scan), the forcibly generated laser beam is detected by the SOS sensor S (time t0 in FIG. 5).

After completing the scan of the image area of the previous line, the forced generation of the beam has been started by a timing (timing EOI) appropriate to the leading edge position of the shield member 56. The beam detection via the SOS sensor S is accomplished using the beam output at the end of the forced beam generating interval T1 (final portion), i.e., the portion of the beam having adequately stabilized light, as is clear from a comparison of the [forced beam generation] and [SOS signals] of FIG. 5.

The timing is simultaneously started when the forcibly generated laser beam is detected by the SOS sensor S at time t0.

After the timing is started and a predetermined period elapses to time t1, the aforesaid line image data output is started.

Thus, the laser beam modulated by the image data is emitted, and an electrostatic latent image of the line data is formed on the surface of the photosensitive drum 55 in the image forming area (SOI~EOI). The aforesaid time t1 corresponds to SOI (Start-Of-Image) in FIG. 4.

When the aforesaid emission of the beam modulated by the image data is completed at time t2, then, the data for forcing beam generation are output at time t3 (refer to LDATA in FIG. 5).

Thus, the forced generation of the beam is started, as indicated by [forced beam generation] in FIG. 5. The next scan by the aforesaid forced beam is continued until the SOS signal is output, as previously described.

Furthermore, the previously described time t3 corresponds to the EOI (End-Of-image). That is the time t3 corresponds to the position for starting the blocking of the beam by the shield member 56 (the position on the surface of the photosensitive drum 55).

The following description is illustrated using numerical examples.

As shown in FIG. 4, the aforementioned LDATA output timing is controlled such that the distance between the leading edge of the sensor S and the SOI (right end in FIG. 4), is 20.0 mm and the distance between the positions SOI and EOI, i.e., the width of the image area, is 215.9 min. The photosensitive area corresponds to the length of the photosensitive drum in the axial direction, i.e., 250.0 min.

When the modulation frequency is 2 MHz and the print density is 300 dpi, the time required for scanning 1 mm is $\frac{1}{2} \times (300/25.4) = 5.9055$ μsec/mm. The aforesaid control is expected to be executed by starting the forced beam generation by the semiconductor laser 51 at a time (corresponding to the time t3) following the elapse of $(20.0+215.9) \times 5.9055$ μsec after the laser beam detection by the SOS sensor S (time corresponding to t0).

However, the SOS sensor and the shield member may respectively have mounting errors. These mounting errors must be within a range of ±0.5 mm, respectively.

To precisely shield the forced beam and to reliably form an image to the terminal edge of the image area (EOI in the drawing) in consideration of these mounting errors, a position removed $20.0+0.5+216.4+0.5=237.4$ mm from the leading end of the SOS sensor S (right edge of FIG. 4) must be set as the EOI position, and control may be executed so as to start the forced beam at said position.

The aforesaid 216.4 mm is the value set to reliably assure the distance of 215.9 mm of the image area between positions SOI~EOI while compensating for the shield member 56 mounting error of ±0.5 mm, i.e., $215.9+0.5=216.4$ mm.

Using the previously calculated value of 237.4 ram, the time required for scanning is $237.4 \times 5.9055 = 1,401.97$ μsec.

That is, when the aforesaid mounting errors are considered, control is accomplished by starting the forced emission of the semiconductor laser 51 at a time (corresponding to t3) 1,401.97 μsec after the laser beam is detected by the SOS sensor S (corresponding to time t0).

There are, however, more than the aforesaid two mounting errors to consider.

Laser scanning speed error caused by an error in the number of rotations of the polygonal mirror 53 as well as timer timing error must also be considered.

When the rotational frequency error of the -polygonal mirror 53 is ±0.1%, the aforesaid time required for scanning (i.e., 1,401.97 μsec) becomes at least $1,401.97 \times 1.001 = 1,403.97$ μsec, otherwise the aforesaid requirement, to wit, "the forced beam must be precisely shielded and image must be formed up to the terminal edge of the image area" cannot be fulfilled.

When the timer is set in the central processing unit (CPU) as the CPU clock, and a ceramic oscillator is used (e.g., Murata model CST12MT) having the characteristics:

| | |
|---|---|
| oscillation frequency initial deviation: | ±0.5% |
| oscillation frequency temperature stability: | ±0.4% |
| time aging: | ±0.3% | the time required for scanning of 1,403.97 μsec may be set in the timer. A constant timer value T must be set such that $\tau \times 0.995 \times 0.996 \times 0.997 = 1,403.37$, i.e., $\tau = 1,403.37/(0.995 \times 0.996 \times 0.997) = 1,420.35$ μsec.

In fact, decimals less than 1 μsec is raised to the next whole number, that is, $\tau = 1,421$.

The aforesaid arrangement realizes the present embodiment of the invention.

The present invention is an image forming apparatus of the laser scanning type comprising a laser generating means, optical system, image forming means, beam detecting sensor provided at a predetermined position on the main scan starting side, shield member arranged at a predetermined position and the main scan ending side, and a timing means, and further comprises a control means for stopping the beam output with each beam detection timing cycle, starting beam output in accordance with a single line of image data with each timing cycle wherein the main scan reaches the image forming area, and starting the forced beam generation with each timing cycle wherein the main scan reaches the shielded position.

According to the present invention, after the laser beam completes a scan of the image area, the SOS sensor starts the forced beam generation at a relatively early stage, i.e., after a period corresponding to the position blocking start position of the shield member, and continues until interrupted by detection via the SOS sensor. The shield member is disposed at a position directly behind the image area, and the SOS sensor is disposed at a position immediately in front of the image area.

Therefore, the light quantity of the forcibly generated laser beam is adequately stabilized at the time said beam arrives at the SOS sensor position, and using said time as a standard time, high precision values are derived. Accordingly, excellent image formation is achieved completely without image jitter even in high-speed laser printers.

Furthermore, since the forcibly generated laser beam is generated with a timing so as to block said beam via the shield member, said beam does not form an image on the surface of the photosensitive drum.

Although the above embodiment has been described in terms of an image forming member which forms electrostatic latent images having a pattern corresponding to the laser beam on the surface of a photosensitive member, it is to be understood that, for example, a means for forming images on microfilm using a laser COM system (system for printing images on microfilm), or means for printing a CT image on silver salt film may also be used.

Further, while the above embodiment has been described as having a shield member provided only at a position directly behind the image forming area on the surface of the photosensitive member, it should be understood that the construction may include an arrangement wherein said shield member blocks laser beam until just before the beam input of the laser beam detecting means.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus of a laser scanning type comprising:
   beam generating means for generating a laser beam from a semiconductor laser, said laser beam capable of being modulated by image drive data;
   an image forming member having a surface;
   an optical system for repeatedly scanning a laser beam in a main scan direction across the surface of the image forming member, the main scan direction having a beginning side and a terminal side;
   image forming means for forming an image corresponding to the image drive data on the surface of the image forming member;
   beam detecting means provided at the beginning side of the main scan for detecting the laser beam before activation of the image forming means;
   a shield member provided at the terminal side of the main scan to block the irradiation of the laser beam to the surface of the image forming member; and
   beam driving means for driving said beam generating means to stop the generation of a laser beam with each beam detecting timing cycle of said beam detecting means, including means for starting a generation of a laser beam by the image forming means in accordance with the image drive data when the main scan beam reaches a predetermined image forming area, and means for forcibly causing a generation of a laser beam by the beam generating means when the main scan beam reaches said shield member.

2. The image forming apparatus as claimed in claim 1, wherein said beam driving means will not drive the generation of a laser beam when the image data is finished until the main scan laser beam reaches said shield member.

3. The image forming apparatus as claimed in claim 1 further comprising a control circuit for determining a timing for outputting the forcibly causing laser beam, wherein said timing is determined taking into account of any mounting errors of said beam detecting means and said shield member.

4. The image forming apparatus as claimed in claim 3, wherein the timing for outputting the forcibly causing beam is determined further taking into account any laser scanning speed error of said optical system and timing error of said timing means.

5. An image forming apparatus of a laser scanning type comprising:
   beam generating means for generating a laser beam from a semiconductor laser, said laser beam capable of being modulated by image drive data;
   an image forming member having a surface;
   image forming means for forming an image corresponding to the drive data on the surface of an image forming member by repeatedly scanning a laser beam thereon in a main scan direction by an optical system;
   beam detecting means provided at a beginning side of the main scan for detecting said laser beam before image formation;
   a shield member provided at a terminal side of the main scan to block the irradiation of the laser beam to an outside of an image forming area on the surface of the image forming member;
   timing means for timing a first and a second predetermined time period on the basis of the detecting time of said beam detection means, said second predetermined time period terminating when the main scan reaches said shield member; and
   beam driving means for driving said beam generating means to stop the laser beam until the first predetermined period has been elapsed, for starting the laser beam in accordance with an image data thereafter, and for forcibly causing a start of the laser beam when the second predetermined time period has been elapsed.

6. The image forming apparatus as claimed in claim 5 further comprising a control circuit for determining said first and second predetermined periods, wherein said second predetermined period is determined taking into account any mounting errors of said beam detecting means and said shield member.

7. The image forming apparatus as claimed in claim 6, wherein said second predetermined period is determined by said a control circuit further taking into account any laser scanning speed error of the optical system and timing error of said timing means.

8. An image forming apparatus of laser scanning type comprising:
beam generating means for generating a laser beam from a semiconductor laser, said beam being modulated by a drive data;
optical system for repeatedly scanning a beam in a main scan direction on the surface of an image forming member;
image forming means for forming an image corresponding to the drive data on the surface of the image forming member by displacing the surface in a sub scan direction vertical to the main scanning direction;
beam detecting means provided at the beginning side of the main scan for detecting laser beam before the scan of said image forming member;
shield member provided at the terminal side of the main scan to block the irradiation of the laser beam to the outside of the image forming area on the surface of the image forming member;
timing means for starting timing on the basis of the detection time of said beam detecting means; and
beam driving means for driving the beam generating means to stop the beam output with each beam detecting timing cycle, starting beam output in accordance with an image data when a predetermined period has elapsed after the start of timing by said timing means, and forcibly causing beam output since the main scan beam reaches said shield member until the beam of a next main scan is detected by said beam detecting means.

9. The image forming apparatus as claimed in claim 8, wherein said beam driving means causes no beam output since the beam output in accordance with the image data is finished until the main scan beam reaches said shield member.

10. The image forming apparatus as claimed in claim 8, further comprising a control circuit for determining a timing for outputting the forcibly causing beam, when said timing is determined taking into account any mounting errors of said beam detecting means and said shield member.

11. The image forming apparatus as claimed in claim 10, wherein said timing is determined by said control circuit further taking into account any laser scanning speed error of said optical system and error of said timing means.

12. An image forming apparatus of a laser scanning type comprising:
beam generating means for generating a laser beam from a semiconductor laser, said laser beam capable of being modulated by image drive data;
an image forming member having a surface;
an optical system for repeatedly scanning a beam in a main scan direction across the surface of the image forming member, the main scan direction having a beginning side and a terminal side;
image forming means for forming an image corresponding to the image drive data on the surface of the image forming member by displacing the surface in a sub scan direction vertical to the main scanning direction;
beam detecting means provided at the beginning side of the main scan for detecting the laser beam before activation of the image forming means;
a shield member provided at the terminal side of the main scan to block the irradiation of the laser beam to the surface of the image forming member; and
beam driving means for driving said beam generating means to stop the generation of a laser beam with each beam detecting timing cycle of said beam detecting means, for starting a generation of a laser beam by the image forming means in accordance with the image drive data when the main scan beam reaches a predetermined image forming area, and for forcibly causing a generation of a laser beam by the beam generating means when the main scan beam reaches said shield member.

13. A high speed laser scanning printer comprising:
laser means for generating a laser beam;
means for modulating the laser beam with image data;
an image forming surface;
means for scanning the laser beam across the image forming surface, the image forming surface having a beginning portion and a terminal portion relative to the scan of the laser beam;
a laser beam detector adjacent the beginning portion of the image forming surface, for generating a laser beam detecting signal;
a shield member adjacent the terminal portion of the image forming surface; and
control means for driving the laser means in response to the laser beam detection signal at a first predetermined time period for providing images from the image data on the image forming surface and for driving the laser means at a second predetermined time period when the means for scanning positions the laser beam on the shield member to thereby stabilize a laser beam intensity prior to being scanned across the laser beam detector.

* * * * *